(12) United States Patent
Kang et al.

(10) Patent No.: US 9,272,364 B2
(45) Date of Patent: Mar. 1, 2016

(54) LASER IRRADIATION DEVICE AND LASER INDUCED THERMAL IMAGING METHOD

(75) Inventors: Tae-Min Kang, Suwon-si (KR); Jae-Ho Lee, Suwon-si (KR); Seong-Taek Lee, Suwon-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 2193 days.

(21) Appl. No.: 11/358,314

(22) Filed: Feb. 22, 2006

(65) Prior Publication Data
US 2006/0188825 A1     Aug. 24, 2006

(30) Foreign Application Priority Data

Feb. 22, 2005   (KR) .................. 10-2005-0014716

(51) Int. Cl.
| | |
|---|---|
| B23K 26/06 | (2014.01) |
| B23K 26/00 | (2014.01) |
| B41J 2/475 | (2006.01) |
| B41M 5/382 | (2006.01) |

(52) U.S. Cl.
CPC .......... B23K 26/0661 (2013.01); B41J 2/4753 (2013.01); B41M 5/38221 (2013.01); B23K 26/0604 (2013.01); B23K 26/0648 (2013.01); B23K 26/0656 (2013.01)

(58) Field of Classification Search
CPC .......... B23K 26/0656; B23K 26/0648; B23K 26/0604
USPC .............. 219/121.73, 121.68, 121.75, 121.76
See application file for complete search history.

(56) References Cited

U.S. PATENT DOCUMENTS

| | | | | |
|---|---|---|---|---|
| 4,857,697 | A | * | 8/1989 | Melville .................. 219/121.63 |
| 5,998,085 | A | * | 12/1999 | Isberg et al. .................. 430/200 |
| 6,114,088 | A | | 9/2000 | Wolk et al. |

(Continued)

FOREIGN PATENT DOCUMENTS

| | | |
|---|---|---|
| CN | 1541504 | 10/2004 |
| DE | 4212390 A1 * | 10/1993 |

(Continued)

OTHER PUBLICATIONS

Korean Office action for Korean patent application No. 10-2005-0014716 issued on Aug. 9, 2006.

(Continued)

*Primary Examiner* — Dana Ross
*Assistant Examiner* — Hemant Mathew
(74) *Attorney, Agent, or Firm* — Robert E. Bushnell, Esq.

(57) ABSTRACT

A laser irradiation device includes a laser generator for patterning and a laser generator for preheating. A laser induced thermal imaging (LITI) method, includes preparing an acceptor substrate, laminating a donor substrate on the acceptor substrate, and irradiating a laser beam onto a predetermined region of the donor substrate and carrying out transfer using a laser irradiation device having a laser generator for patterning and a laser generator for preheating. Advantageously, a laser beam having high intensity generated by the laser generator for patterning is used to prevent the transfer layer from being degraded, and a laser beam generated by the laser generator for preheating is simultaneously used for preheating so that an edge open failure does not occur and the transfer can be readily carried out even in a portion having a step of the acceptor substrate.

17 Claims, 3 Drawing Sheets

(56) References Cited

U.S. PATENT DOCUMENTS

| | | | |
|---|---|---|---|
| 6,140,009 A * | 10/2000 | Wolk et al. ............... | 430/200 |
| 6,184,917 B1 * | 2/2001 | Chiba et al. .............. | 347/256 |
| 6,214,520 B1 | 4/2001 | Wolk et al. | |
| 6,501,047 B1 | 12/2002 | Xuan et al. | |
| 6,838,038 B2 | 1/2005 | Lovell et al. | |
| 7,277,110 B2 | 10/2007 | Zarem et al. | |
| 8,062,984 B2 | 11/2011 | Caln et al. | |
| 2003/0080099 A1 * | 5/2003 | Tanaka et al. ........... | 219/121.73 |
| 2003/0149427 A1 * | 8/2003 | Waner et al. ............. | 606/9 |
| 2005/0035104 A1 * | 2/2005 | Tanaka et al. ........... | 219/121.76 |
| 2005/0057727 A1 * | 3/2005 | Troyer ..................... | 353/31 |
| 2005/0155956 A1 * | 7/2005 | Hamada et al. .......... | 219/121.69 |
| 2005/0247683 A1 * | 11/2005 | Agarwal et al. .......... | 219/121.73 |

FOREIGN PATENT DOCUMENTS

| | | | | |
|---|---|---|---|---|
| EP | 1357590 A2 * | 10/2003 | ............. | H01L 21/68 |
| JP | 61-264862 | 11/1986 | | |
| JP | 61264862 | 11/1986 | | |
| JP | 06055285 | 3/1994 | | |
| JP | 06344168 A * | 12/1994 | | |
| JP | 08-118819 | 5/1996 | | |
| JP | 09-122942 | 5/1997 | | |
| JP | 09122942 | 5/1997 | | |
| JP | 09300087 A * | 11/1997 | | |
| JP | 11329939 A * | 11/1999 | | |
| JP | 2000-515083 | 11/2000 | | |
| JP | 2002-001564 | 1/2002 | | |
| JP | 2002-534782 | 10/2002 | | |
| KR | 2000-0034508 | 6/2000 | | |
| WO | WO 2004/020140 | 3/2004 | | |
| WO | WO 2004020140 A1 * | 3/2004 | | |

OTHER PUBLICATIONS

Office action from the Chinese Patent Office issued in Applicant's corresponding Chinese Patent Application No. 200610067365.1 dated Aug. 29, 2008.

Office action from the Japanese Patent Office issued in Applicant's corresponding Japanese Patent Application No. 2006-042515 dated Sep. 2, 2008.

Office action from the Japanese Patent Office issued in Applicant's corresponding Japanese Patent Application No. 2006-042515 dated Apr. 7, 2009.

Request for Entry of the Accompanying Document for Japanese Notice of Allowance attached herewith.

Notice of Allowance from Japanese Patent Office issued in Applicant's corresponding Japanese Patent Application No. 2006-042515 dated Sep. 29, 2009.

Overlap—definition at http://www.merriam-webster.com/dictionary/overlap.

Overlap—definition at http://www.thefreedictionary.com/overlap.

Overlap—definition at http://dictionary.reference.com/browse/overlap.

Partially—definition at http://dictionary.weather.net/dictionary/partially.

Partial—definition at http://dictionary.reference.com/browse/partial.

Partially—definition at http://www.wordreference.com/definition/partially.

Laser engraving—Wikipedia at http://en.wikipedia.org/wiki/Laser_engraving (printed on Sep. 22, 2011).

Office Action from the Chinese Patent Office issued in Applicant's corresponding Chinese Patent Application No. 2006-10067365.1 dated Nov. 16, 2007.

* cited by examiner

SCANNING DIRECTION

SCANNING DIRECTION

LASER IRRADIATION DEVICE AND LASER INDUCED THERMAL IMAGING METHOD

CLAIM OF PRIORITY

This application makes reference to, incorporates the same herein, and claims all benefits accruing under 35 U.S.C. §119 from an application for LASER IRRADIATION DEVICE AND LASER INDUCED THERMAL IMAGING earlier filed in the Korean Intellectual Property Office on Feb. 22, 2005 and there duly assigned Serial No. 10-2005-0014716.

BACKGROUND OF THE INVENTION

1. Field of the Invention

The present invention relates to a laser irradiation device and a laser induced thermal imaging method, and more particularly, to a laser irradiation device including a laser generator for patterning and a laser generator for preheating, and a laser induced thermal imaging method.

2. Description of the Related Art

In general, an organic light emitting diode (OLED) includes an anode electrode, a cathode electrode, and organic layers interposed between the anode and cathode electrodes. Such an OLED is classified into a polymer OLED and a small molecule OLED according to a material of forming the organic layer, in particular, an emission layer.

In order to realize a full color OLED, the emission layer should be patterned, and a method of using a shadow mask is employed in the small molecule OLED and an ink-jet printing or Laser Induced Thermal Imaging (hereinafter, referred to as an LITI) method is employed for patterning the emission layer. Among these methods, the LITI has advantages in that the organic layer can be finely patterned and a large-area and high resolution display can be easily realized. The LITI also has an advantage in that a dry process is used, whereas a wet process is used in the ink-jet printing method.

The LITI is a transfer method using laser, which requires at least a light source, a substrate, and a donor substrate to form the organic layer using the method. A laser beam generated in a laser irradiation device is used as the light source. This is disclosed in Korean Patent Application No. 1998-51844, and U.S. Pat. Nos. 5,998,085, 6,214,520, and 6,114,088.

A conventional laser irradiation device and LITI method include a donor substrate 150 being laminated on an acceptor substrate where predetermined elements are formed. The donor substrate is composed of a base substrate, a light-to-heat conversion layer formed on the base substrate, and a transfer layer formed on the light-to-heat conversion layer.

In this case, a laser beam generated by a laser irradiation device is used as a light source for irradiating light onto the donor substrate.

The laser irradiation device includes a laser generator, a patterned mask, and a projection lens.

The laser generator is used to irradiate the laser beam onto a predetermined region of the base substrate. In this case, the laser beam generated by the laser generator passes through the patterned mask, and the passed laser beam is refracted by the projection lens to be irradiated onto the base substrate. The laser beam is blocked in an unpatterned portion of the mask.

The laser beam irradiated onto the predetermined region of the base substrate is absorbed by the light-to-heat conversion layer to be converted into thermal energy. A gas is generated in the light-to-heat conversion layer by the absorbed thermal energy, which causes the light-to-heat conversion layer to be swollen. The swollen light-to-heat conversion layer causes the transfer layer to be adhered onto the acceptor substrate, and the adhered transfer layer is disconnected from the donor substrate, so that the transfer layer is transferred onto the acceptor substrate.

In this case, when temperature excessively increases due to the delivered thermal energy, the transfer layer may be degraded. A laser beam having high intensity may be used to prevent the transfer layer from being degraded, however, the transfer layer is partially disconnected in a portion having a step formed in the acceptor substrate so that the transfer is not carried out on the portion. This is called an edge open failure or an untransferred failure. This is because the laser beam is irradiated for a short time so that the temperature of the light-to-heat conversion layer does not increase enough to cause the transformation.

SUMMARY OF THE INVENTION

The present invention, therefore, provides a laser irradiation device and an LITI method, which are capable of preventing a transfer layer from being degraded in a transfer process using the LITI, and facilitating the transfer even in a portion having a step.

One aspect of the present invention provides a laser irradiation device. The laser irradiation device includes a laser generator for patterning and a laser generator for preheating.

Another aspect of the present invention provides an LITI method. The method includes: preparing an acceptor substrate; laminating a donor substrate on the acceptor substrate; and irradiating a laser beam onto a predetermined region of the donor substrate and carrying out transfer using a laser irradiation device having a laser generator for patterning and a laser generator for preheating.

The laser irradiation device may further include a patterned mask formed below the laser generator for patterning; and a projection lens formed below the patterned mask, and may further include a beam shaping device formed below the laser generator for preheating.

In addition, the laser irradiation device may further include a patterned mask formed below the laser generator for preheating; and a projection lens formed below the patterned mask.

The laser generator for patterning and the laser generator for preheating may generate laser beams having different waveforms from each other.

The laser beam generated by the laser generator for patterning may have an intensity higher than that of the laser beam generated by the laser generator for preheating.

The laser beams generated by the laser generator for patterning and the laser generator for preheating, respectively, may have an overlapping region in their irradiation regions.

The donor substrate may include a base substrate; a light-to-heat conversion (LTHC) layer formed on the base substrate; and a transfer layer formed on the LTHC layer, and the laser beam generated by the laser generator for preheating may increase a temperature of the LTHC layer up to a glass transition temperature Tg of the transfer layer.

In addition, the donor substrate may further include a buffer layer formed between the LTHC layer and the transfer layer, and the laser beam generated by the laser generator for preheating may increase a temperature of the buffer layer up to a glass transition temperature Tg of the transfer layer.

Pixel electrodes constituting an organic light emitting diode (OLED) may be formed on the acceptor substrate, and the transfer layer may be formed of an organic material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
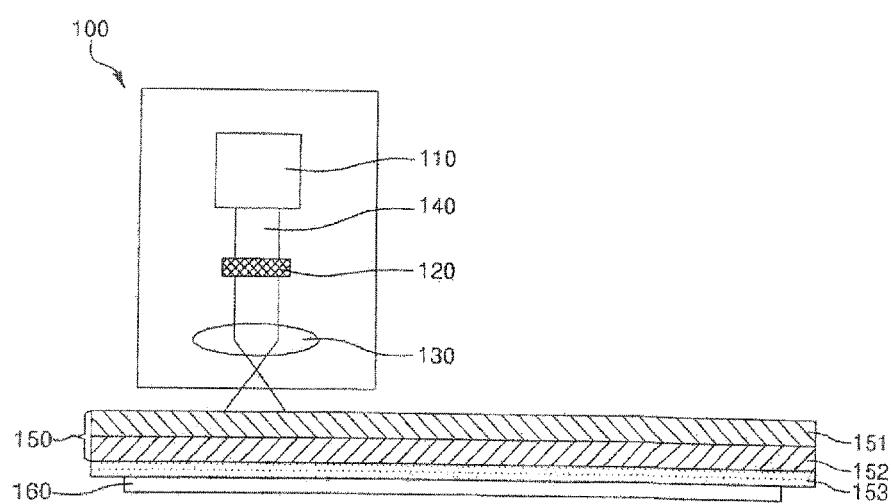
FIG. 1 is a schematic view illustrating a conventional laser irradiation device and LITI method.

Turning now to the drawings, FIG. 1 is a schematic view illustrating a conventional laser irradiation device and LITI method.

Referring to FIG. 1, a donor substrate 150 is laminated on an acceptor substrate 160 where predetermined elements are formed. The donor substrate 150 is composed of a base substrate 151, a light-to-heat conversion layer 152 formed on the base substrate 151, and a transfer layer 153 formed on the light-to-heat conversion layer 152.

In this case, a laser beam generated by a laser irradiation device 100 is used as a light source for irradiating light onto the donor substrate 150.

The laser irradiation device 100 includes a laser generator 110, a patterned mask 120, and a projection lens 130.

The laser generator 110 is used to irradiate the laser beam 140 onto a predetermined region of the base substrate 151. In this case, the laser beam 140 generated by the laser generator 110 passes through the patterned mask 120, and the passed laser beam 140 is refracted by the projection lens 130 to be irradiated onto the base substrate 151. The laser beam 140 is blocked in an unpatterned portion of the mask 120.

The laser beam 140 irradiated onto the predetermined region of the base substrate 151 is absorbed by the light-to-heat conversion layer 152 to be converted into thermal energy. A gas is generated in the light-to-heat conversion layer 152 by the absorbed thermal energy, which causes the light-to-heat conversion layer 152 to be swollen. The swollen light-to-heat conversion layer 152 causes the transfer layer 153 to be adhered onto the acceptor substrate 160, and the adhered transfer layer 153 is disconnected from the donor substrate 150, so that the transfer layer 153 is transferred onto the acceptor substrate 160.

In this case, when temperature excessively increases due to the delivered thermal energy, the transfer layer 153 may be degraded. A laser beam having high intensity may be used to prevent the transfer layer 153 from being degraded, however, the transfer layer 153 is partially disconnected in a portion having a step formed in the acceptor substrate 160 so that the transfer is not carried out on the portion. This is called an edge open failure or an untransferred failure. This is because the laser beam is irradiated for a short time so that the temperature of the light-to-heat conversion layer 152 does not increase enough to cause the transformation.

The present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

Figure 2A:
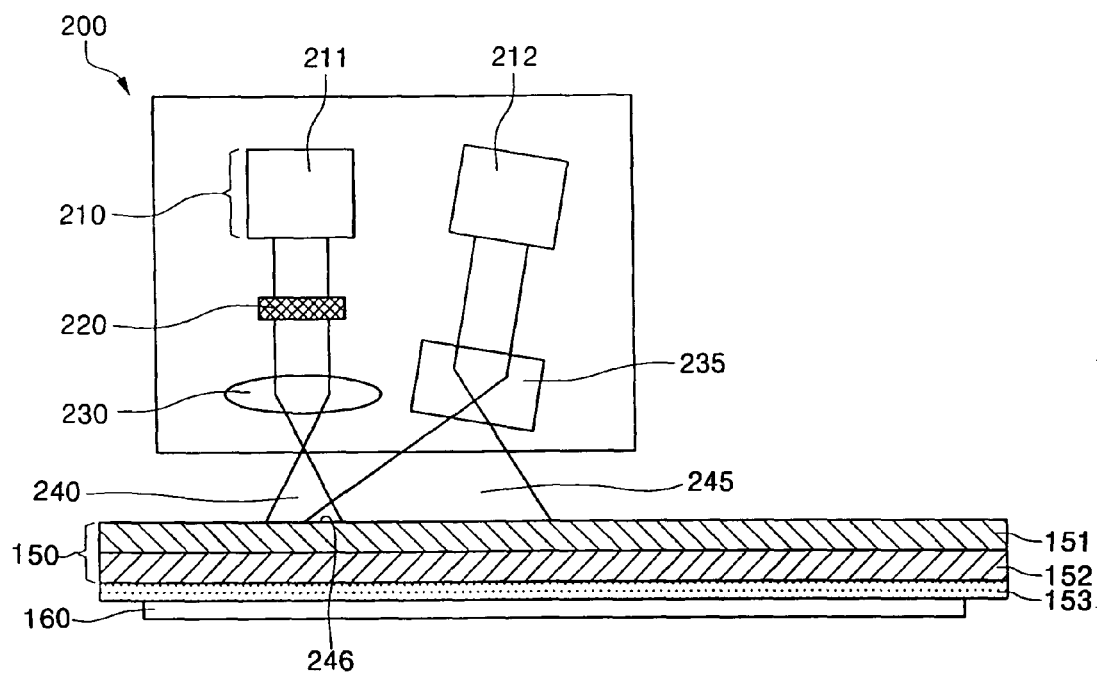
FIGS. 2A and 2B are schematic views illustrating a laser irradiation device and an LITI method in accordance with a first embodiment of the present invention.
Figure 2B:
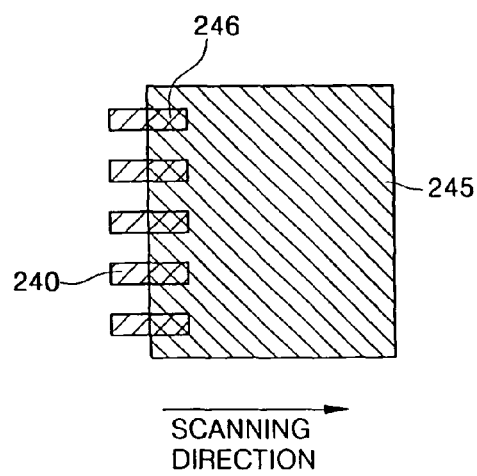

FIGS. 2A and 2B are schematic views illustrating a laser irradiation device and an LITI method in accordance with a first embodiment of the present invention.

Referring to FIG. 2A, a donor substrate 150 is laminated on an acceptor substrate 160. The donor substrate 150 preferably has a size enough to cover the acceptor substrate 160, however, the donor substrate 150 may have a size smaller than the acceptor substrate 160 if necessary.

Predetermined elements constituting an OLED may be formed on the acceptor substrate 160. That is, a thin film transistor, a planarization layer formed thereon, and a pixel electrode formed on the planarization layer may be present.

The donor substrate 150 may be one for the OLED. That is, it may be composed of a base substrate 151, a light-to-heat conversion layer 152 formed on the base substrate 151, and a transfer layer 153 formed on the light-to-heat conversion layer 152.

The base substrate 151 may be formed of a transparent polymer, and polyester such as terephthalate, polyethylene, polyacrylate, polyepoxy resin, polyethylene, polystyrene or the like may be used for the polymer.

The light-to-heat conversion layer 152 is a layer which absorbs light emitted from a light source, i.e., a laser beam, and converts it to thermal energy, and may be formed of one of an organic layer containing a laser beam absorbing material, a metal, and a multi layer thereof.

A gas generation layer (not shown) may be formed at a position adjacent to the light-to-heat conversion layer 152. The gas generation layer serves to provide transfer energy by causing a dissolving reaction to emit a nitrogen gas or a hydrogen gas when it absorbs light or heat, and may be formed of a material selected from a group including pentaerythritol tetranitrate (PETN), trinitrotoluene (TNT), and so forth. The gas generation layer should receive heat from the light-to-heat conversion layer 152 so that it may be adjacent to an upper or lower part of the light-to-heat conversion layer 152, or may be combined with a material forming the light-to-heat conversion layer 152 to be one layer.

The transfer layer 153 is a material layer to be patterned onto the acceptor substrate 160, and may be formed of an organic material. When the OLED is fabricated using the donor substrate 150, the donor substrate 150 may have a single layer of one selected from a group including an organic layer for a hole injecting layer, an organic layer for a hole transporting layer, an organic layer for an emission layer, an organic layer for a hole blocking layer, an organic layer for an electron transporting layer, and an organic layer for an electron injecting layer, or may have a multi-layer of at least two thereof. Further, the organic layers may be formed of a polymer material or small molecule material. In the meantime, the transfer layer 153 may be formed using extrusion, spin-coating, knife-coating, evaporation, or chemical vapor deposition (CVD).

A buffer layer (not shown) may be further formed between the light-to-heat conversion layer 152 and the transfer layer 153. The buffer layer serves to control adhesion of the transfer layer 153 so as to enhance a transfer pattern property.

The donor substrate 150 may further include not only the above-described layers but also other layers having various purposes, and may use a changed multi-layer structure according to the purposes.

A laser beam is irradiated onto a predetermined region of the donor substrate 150 laminated on the acceptor substrate 160 to make the transfer layer 153 transferred onto the acceptor substrate 160.

In this case, a laser beam generated by a laser irradiation device 200 is used as a light source for irradiation onto the donor substrate 150.

The laser irradiation device 200 includes a laser generator 210. The present invention employs the laser generator 210 which includes a laser generator for patterning 211 and a laser generator for preheating 212.

The laser irradiation for patterning 211 generates a laser beam 240 required to disconnect the transfer layer 153 from the donor substrate 150 and make it transferred onto the acceptor substrate 160 to form a predetermined pattern. Accordingly, the laser beam 240 generated by the laser generator for patterning 211 has intensity enough to cause the disconnection of the transfer layer 153.

The laser generator for preheating 212 generates a laser beam 245 for preheating the donor substrate 150. That is, the laser generator for preheating 212 allows the light-to-heat conversion layer 152 or the buffer layer to be preheated up to a predetermined temperature to facilitate transformation.

The laser beam 245 generated by the laser generator for preheating 212 is absorbed by the light-to-heat conversion layer 152 to be converted to thermal energy. In this case, the temperature of the light-to-heat conversion layer 152 increases due to the generated heat, and the laser beam 245 is irradiated to make the temperature increase up to a glass transition temperature, Tg, of the transfer layer 153. The glass transition temperature Tg means a temperature where a material starts to be softened, and the glass transition occurs in a polymer material. That is, the polymer material acts as a rubber at a temperature not less than the glass transition temperature and acts as a glass which is hard and fragile at a temperature less than the glass transition temperature.

Accordingly, the thermal energy is delivered from the light-to-heat conversion layer 152 having the temperature increased up to the glass transition temperature to the transfer layer 153 so that the transfer layer 153 maintains in a state which allows it to be readily transformed. However, the light-to-heat conversion layer 152 does not necessarily need to be heated up to the glass transition temperature of the transfer layer 153, and may be heated to a temperature less than the glass transition temperature of the transfer layer 153 when the transfer layer 153 can be readily transformed.

When the buffer layer is formed between the light-to-heat conversion layer 152 and the transfer layer 153, the buffer layer is heated up to the glass transition temperature of the transfer layer 153.

Accordingly, even when the laser beam 240 having high intensity generated by the laser generator for patterning 211 is irradiated, the donor substrate 150 can be readily transformed by the laser beam 245 generated by the laser generator for preheating 212, so that the transferring can be readily carried out even in a portion having a step in the acceptor substrate 160.

A patterned mask 220 is formed below the laser generator for patterning 211, and a projection lens 230 is formed below the mask 220.

The laser beam 240 generated by the laser generator for patterning 211 passes through the patterned mask 220, and the passed laser beam 240 is refracted by the projection lens 230 to be irradiated onto the base substrate 151. The laser beam 240, generated by the laser generator for patterning 211, is blocked in an unpatterned portion of the mask 220.

A beam shaping device 235 is formed below the laser generator for preheating 212. A fly eye lens or a cylindrical lens may be formed in the beam shaping device 235. Accordingly, the laser beam 240 generated by the laser generator for patterning 211 has uniform intensity through the beam shaping device 235, and is shaped to have a predetermined shape, e.g. rectangle or circle.

The laser generator for patterning 211 and the laser generator for preheating 212 irradiate the laser beams 240 and 245 onto the base substrate 151 of the donor substrate 150, respectively.

The generated laser beams 240 and 245 preferably have different waveforms from each other. In particular, the intensity of the laser beam 240 generated by the laser generator for patterning 211 is higher than the intensity of the laser beam 245 generated by the laser generator for preheating 212. The laser beam 240 generated by the laser generator for patterning 211 is used for the disconnection of the transfer layer 153, so that the laser beam 240 generated by the laser generator for patterning 211 has an intensity higher than that of the laser beam 245 for preheating the donor substrate 150.

FIG. 2B illustrates a laser beam irradiated onto the donor substrate.

Referring to FIG. 2B, the laser beam 240 generated by the laser generator for patterning 211 becomes a multi beam having a constant pattern by means of the patterned mask 220, and then is irradiated onto the base substrate 151.

In contrast, the laser beam 245 generated by the laser generator for preheating 212 is shaped to a single laser beam 245 having, for example, a rectangular shape by a beam shaping device 235 and then irradiated.

In this case, the laser beams 240 and 245 have a region 246 overlapping each other. The laser irradiation device 200 carries out the transfer process while scanning in the arrow direction, so that it can preheat the donor substrate 150 at the same time while transferring the transfer layer 150 onto the acceptor substrate 160.

When the laser beams 240 and 245 do not have the region overlapping each other, the patterning is carried out after a predetermined time is elapsed after the donor substrate 150 is preheated, so that the temperature of the donor substrate 150 may decrease.

Accordingly, a layer having a desired pattern can be transferred onto the acceptor substrate 160. In particular, when pixel electrodes constituting the OLED are formed on the acceptor substrate 160, an organic emission layer or the like may be transferred onto the acceptor substrate 160.

Figure 3A:
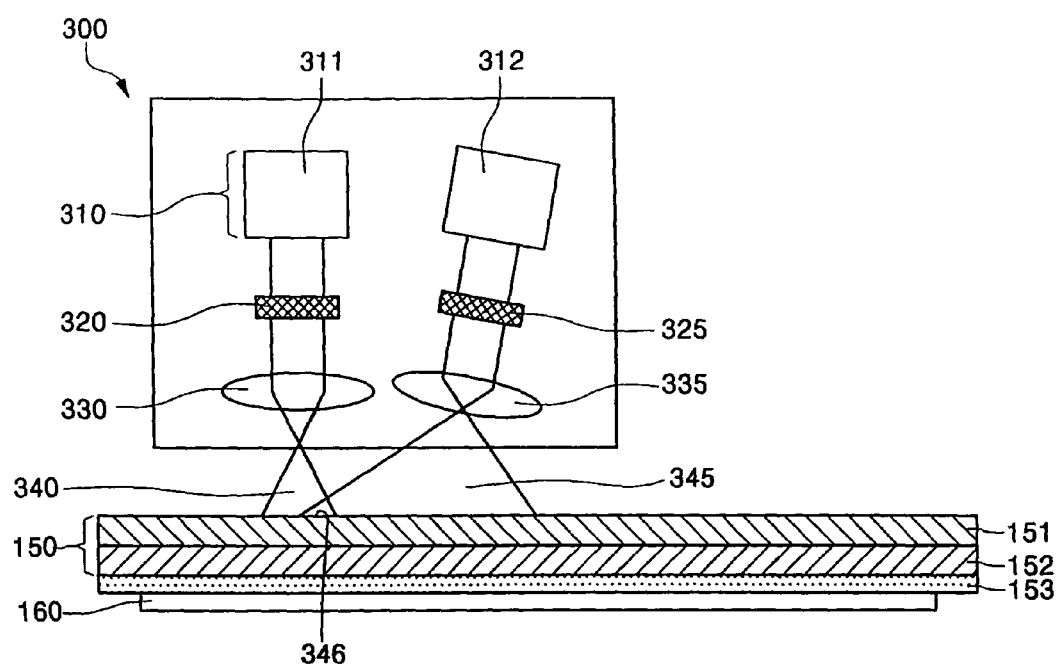
FIGS. 3A and 3B are schematic views illustrating a laser irradiation device and an LITI method in accordance with a second embodiment of the present invention.
Figure 3B:
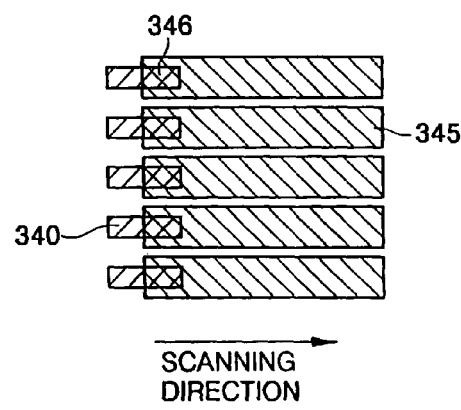

FIGS. 3A and 3B are schematic views illustrating a laser irradiation device and an LITI method in accordance with a second embodiment of the present invention.

Referring to FIG. 3A, a donor substrate 150 is laminated on an acceptor substrate 160. A laser irradiation device 300 includes a laser generator 310.

A patterned mask 320 is formed below a laser generator for patterning 311, and a projection lens 330 is formed below the patterned mask 320.

A patterned mask 325 is formed below a laser generator for preheating 312, and a projection lens 335 is formed below the patterned mask 325.

Laser beams 340 and 345 generated by the laser generator for patterning 311 and the laser generator for preheating 312 pass through the patterned masks 320 and 325, respectively. The passed laser beams 340 and 345 are refracted by the projection lens 330 and 335 to be irradiated onto the base substrate 151, respectively. The laser beams 340 and 345 are blocked in unpatterned portions of the masks 320 and 325, respectively.

In the present embodiment, the patterned mask 325 and the projection lens 335 are formed below the laser generator for preheating 312. Accordingly, the laser beam 345 is irradiated as a multi beam.

Referring to FIG. 3B, it can be seen that the laser beam 340 generated by the laser generator for patterning 311 and the laser beam 345 generated by the laser generator for preheating 312 are irradiated as multi beams.

In this case, the laser beams 340 and 345 have an overlapping region 346 with each other.

The laser irradiation device and LITI method of the second embodiment are the same as those of the first embodiment of the present invention except for the above description.

According to the present invention as described above, a laser irradiation device including a laser generator for patterning and a laser generator for preheating is employed in a transfer process using the LITI method. Advantageously, a laser beam having high intensity generated by the laser generator for patterning is used to prevent the transfer layer from being degraded, and a laser beam generated by the laser generator for preheating is simultaneously used for preheating so that an edge open failure does not occur and the transfer can be readily carried out even in a portion having a step of the acceptor substrate.

Although the present invention has been described with reference to certain exemplary embodiments thereof, changes and/or modifications may be made to the described embodiments without departing from the scope of the present invention.

What is claimed is:

1. A laser irradiation device, comprising:
   a laser generator scanning one or more regions of a substrate by irradiating a preheating laser beam in a predetermined direction;
   a laser generator scanning the substrate by projecting a patterning laser beam that has an intensity greater than the preheating laser beam toward the substrate in the predetermined direction; and
   a mask defining a pattern passing the patterning laser beam;
   a first projection lens spaced-apart from the preheating laser beam, refracting and irradiating the patterning laser beam passing through the mask to partially overlap the one or more regions on the substrate irradiated by the preheating laser beam, the patterning laser beam disposed behind the preheating laser beam on the substrate along the predetermined direction; and
   a second patterned mask formed below the laser generator irradiating the substrate with the preheating laser beam, shaping the preheating laser beam to form a predetermined shape upon the substrate.

2. The laser irradiation device according to claim 1, further comprising:
   a second projection lens formed below said second patterned mask.

3. The laser irradiation device according to claim 1, wherein said laser generator projecting the patterning laser beam and said laser generator irradiating the substrate with the preheating laser beam generate the laser beams having different waveforms from each other.

4. The laser irradiation device according to claim 1, wherein laser beams created by said laser generator projecting the patterning laser beam and said laser generator irradiating the preheating laser beam are formed independently in said laser irradiation device.

5. The laser irradiation device according to claim 1, wherein the patterning laser beam passes from the mask as a multi beam.

6. The laser irradiation device according to claim 1, wherein the laser beam by said laser generator for preheating is a multi laser beam.

7. A laser irradiation device, comprising:
   a pattern laser generator scanning a donor substrate laminated onto an acceptor substrate in a predetermined direction by projecting a patterning laser beam onto the donor substrate;
   a mask defining a pattern passing the patterning laser beam toward the donor substrate as a multi-beam;
   a preheat laser generator discrete from said pattern laser generator, scanning the donor substrate by irradiating a preheating laser beam on one or more regions of the donor substrate, said preheating laser beam traveling along a path from said preheat laser generator separately from a path traveled by said patterning laser beam, the preheating laser beam disposed ahead of the patterning laser beam on the donor substrate along the predetermined direction, the patterning laser beam passing through the mask to partially overlap the one or more regions on the donor substrate irradiated by the preheating layer beam; and
   a second patterned mask formed below the preheat laser generator, shaping the preheating laser beam to form a predetermined shape upon the donor substrate.

8. The device according to claim 7, wherein said pattern laser generator and said preheat laser generator generate the preheating and the patterning laser beams including waveforms that are different from each other.

9. The device according to claim 7, wherein the donor substrate comprises:
   a base substrate;
   a light-to-heat conversion layer formed on said base substrate; and
   a transfer layer formed on said light-to-heat conversion layer.

10. The device according to claim 9, wherein the preheating laser beam generated by said preheat laser generator increases a temperature of said light-to-heat conversion layer up to a glass transition temperature of said transfer layer.

11. The device according to claim 9, wherein said donor substrate further comprises a buffer layer formed between said light-to-heat conversion layer and said transfer layer.

12. The device according to claim 11, wherein the preheating laser beam generated by said preheat laser generator increases a temperature of said buffer layer up to a glass transition temperature of said transfer layer.

13. The device according to claim 9, wherein pixel electrodes constituting an organic light emitting diode are formed on said acceptor substrate.

14. The device according to claim 13, wherein said transfer layer is formed of an organic material.

15. A laser irradiation apparatus, comprising:
   a patterning laser generator scanning a donor substrate laminated on an acceptor substrate by projecting a first laser beam generated by said patterning laser generator on the donor substrate in a predetermined direction, said first laser beam being a multi beam pattern when incident upon said donor substrate;
   a mask defining a pattern passing the first laser beam toward the donor substrate as a multi-beam;
   a preheat laser generator scanning said donor substrate by irradiating a second laser beam on said donor substrate in the predetermined direction, the preheat laser generator being independently formed in a separate body from said patterning laser generator, the second laser beam being a multi-beam pattern when incident upon said donor substrate; and a second patterned mask formed below the preheat laser generator, shaping the second laser beam to form a predetermined shape upon the donor substrate, wherein the second laser beam is disposed ahead of the first laser beam on said donor substrate along the predetermined direction, and the first laser beam is partially overlapped with the second laser beam.

16. The laser irradiation apparatus according to claim 15, wherein:
    a first projection lens receiving an output from said mask defining the pattern passing the first laser beam; and
    a second projection lens receiving an output from said patterned mask formed below the preheat laser generator.

17. The laser irradiation apparatus according to claim 15, with said preheating laser generator generating the second laser beam for preheating at the same time as said patterning laser generator is generating the first laser beam for patterning.

* * * * *